(12) United States Patent
Murakami et al.

(10) Patent No.: US 11,084,381 B2
(45) Date of Patent: Aug. 10, 2021

(54) JUNCTION BOX CONTROLLER

(71) Applicant: SUBARU CORPORATION, Tokyo (JP)

(72) Inventors: Tsukasa Murakami, Tokyo (JP); Takashi Fukuda, Tokyo (JP); Yukio Karasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 160 days.

(21) Appl. No.: 16/502,469

(22) Filed: Jul. 3, 2019

(65) Prior Publication Data
US 2020/0101848 A1    Apr. 2, 2020

(30) Foreign Application Priority Data

Sep. 28, 2018    (JP) .............................. JP2018-185041

(51) Int. Cl.
| | |
|---|---|
| *B60L 3/04* | (2006.01) |
| *H02G 3/08* | (2006.01) |
| *H02H 5/04* | (2006.01) |
| *H01M 10/44* | (2006.01) |
| *H02H 9/02* | (2006.01) |
| *H02J 7/00* | (2006.01) |
| *H02H 7/18* | (2006.01) |

(52) U.S. Cl.
CPC ............... *B60L 3/04* (2013.01); *H01M 10/44* (2013.01); *H02G 3/08* (2013.01); *H02H 5/04* (2013.01); *H02H 7/18* (2013.01); *H02H 9/02* (2013.01); *H02J 7/00* (2013.01)

(58) Field of Classification Search
CPC ... B60L 3/04; H02G 3/08; H02H 5/04; H02H 7/18; H02H 9/02; H02J 7/0052; H01M 10/44
USPC ........................................................ 320/109
See application file for complete search history.

(56) References Cited

U.S. PATENT DOCUMENTS 5,107,391 A * 4/1992 Siepmann ............ H01H 47/325
                                                    323/265
6,800,807 B2 * 10/2004 Ishiguro et al. ..... B60R 16/0239
                                                    174/377
(Continued)

FOREIGN PATENT DOCUMENTS

JP        2012-196007 A    10/2012

*Primary Examiner* — Sun J Lin
(74) *Attorney, Agent, or Firm* — Troutman Pepper Hamilton Sanders LLP

(57) ABSTRACT

A junction box controller controls a junction box including a circuit for vehicle travel that supplies power from a battery for vehicle travel to an electrical component for vehicle travel and a charging circuit including a positive electrode charging relay and an negative electrode charging relay that are for use in coupling and decoupling the battery for vehicle travel to and from an external charging power source in a state in which the positive electrode charging relay and the negative electrode charging relay are coupled to the circuit for vehicle travel. The junction box controller includes a temperature sensor that detects a temperature of the circuit for vehicle travel, and a controller that, when the temperature of the circuit for vehicle travel reaches or exceeds a preset threshold, controls and switches on either one of the positive electrode charging relay and the negative electrode charging relay.

5 Claims, 11 Drawing Sheets

(56) References Cited

U.S. PATENT DOCUMENTS

| | | | |
|---|---|---|---|
| 8,570,699 B2* | 10/2013 | Shaya et al. | H03K 17/0822 |
| | | | 361/93.1 |
| 10,424,907 B2* | 9/2019 | Kumagai | H02H 3/08 |
| 2012/0119698 A1* | 5/2012 | Karalis et al. | B60L 11/182 |
| | | | 320/108 |
| 2020/0066472 A1* | 2/2020 | Haraguchi | H01R 13/684 |

* cited by examiner

JUNCTION BOX CONTROLLER

CROSS-REFERENCE TO RELATED APPLICATIONS

The present application claims priority from Japanese Patent Application No. 2018-185041 filed on Sep. 28, 2018, the entire contents of which are hereby incorporated by reference.

BACKGROUND

The disclosure relates to a junction box controller and, in particular, to the controller of a junction box having inside a circuit for vehicle travel and a charging circuit. The circuit for vehicle travel supplies power from a battery for vehicle travel to electrical components for vehicle travel. The charging circuit can couple and decouple the battery for vehicle travel to and from a charger for external coupling.

An electrified vehicle such as a hybrid vehicle, in which a motor generator is installed as an electrical component for vehicle travel, is driven by using the motor function of the motor generator and regenerates power by using the generator function of the motor generator. Normally, the motor generator for vehicle travel receives power from a battery for vehicle travel, and the battery for vehicle travel stores the regenerated power. Normally, a main relay (system main relay) for electrically coupling and decoupling the motor generator for vehicle travel to and from the battery for vehicle travel is interposed between the motor generator for vehicle travel and the battery for vehicle travel.

For example, to generate a sufficient driving force, the motor generator for vehicle travel normally has high-voltage, high-current characteristics, and accordingly, the battery for vehicle travel, which supplies power to the motor generator for vehicle travel, also has high-voltage, high-capacity characteristics. Moreover, attention is being paid to a technique of charging a stationary vehicle by coupling a battery for vehicle travel to, for example, a commercial power source. In particular, hybrid vehicles employing the technique are referred to as plug-in hybrid vehicles and are becoming increasingly common.

In addition, some electrified vehicles have a fast-charging system that rapidly charges a battery for vehicle travel by coupling the battery for vehicle travel to, for example, a high-voltage, direct-current, external power source (fast-charging power source). It should be noted that for an electric vehicle (EV), in which only a motor generator is installed as its driving source, typically, a battery for vehicle travel is coupled to an external charging power source and charged.

Such an electrified vehicle, in which a battery for vehicle travel is coupled to an external charging power source and charged, has, for example, an AC-DC converter charger for external coupling and a terminal for external coupling. The AC-DC converter charger for external coupling can be coupled to a commercial power source, and the terminal for external coupling is in use for coupling the battery for vehicle travel to a fast-charging power source. A charging relay for electrically coupling and decoupling the charger for external coupling and the terminal for external coupling to and from the battery for vehicle travel, that is, a charging relay for coupling and decoupling the battery for vehicle travel to and from the external charging power source is, for example, closer than the main relay to the electrical components of the vehicle and interposed between the battery for vehicle travel and the external charging power source.

A box referred to as a junction box often contains both the main relay and the charging relay. Thus, the interior of the junction box has a circuit for vehicle travel and a charging circuit. The circuit for vehicle travel supplies power from the battery for vehicle travel to the electrical components for vehicle travel, and the charging circuit can couple and decouple the battery for vehicle travel to and from the external charging power source. It should be noted that normally, the charging circuit has a positive electrode side charging relay (hereinafter, also referred to as positive electrode charging relay) and a negative electrode-side charging relay (hereinafter, also referred to as negative electrode charging relay). As a wiring material inside the junction box, a bus bar having low electrical resistance and high heat dissipation performance, which enable a high current to flow through the bus bar, is used. In particular, a wiring material (electric wire) having a large conductor cross-sectional area is used to couple the junction box to the terminal for external coupling for use in coupling the battery for vehicle travel to the fast-charging power source.

The plug-in hybrid vehicle disclosed in Japanese Unexamined Patent Application Publication (JP-A) No. 2012-196007 is an example of such an electrified vehicle. For the electrified vehicle, in a state in which a system is stopped and in which the vehicle is coupled to an external charging power source, the value of an exciting current in a main relay corresponds to a predetermined current value that is smaller than a current value when starting the system and at which contact between a stationary contact and a movable contact can be maintained, thereby suppressing an increase in the temperature of the main relay.

It should be noted that hereinafter, electrical connection of a circuit made by bringing the stationary contact and the movable contact of a relay into contact with each other is referred to as switching on, and electrical disconnection of the circuit made by not bringing the stationary contact and the movable contact of the relay into contact with each other is referred to as switching off. It should be noted that as in the case of the above electrified vehicle, charging relays are switched off when starting a system so that an electrified vehicle having the charging relays can travel.

SUMMARY

An aspect of the disclosure provides a junction box controller serving as the controller of a junction box. The junction box includes a circuit for vehicle travel that supplies power from a battery for vehicle travel to an electrical component for vehicle travel, and a charging circuit including a positive electrode charging relay and a negative electrode charging relay that are for use in coupling and decoupling the battery for vehicle travel to and from an external charging power source in a state in which the positive electrode charging relay and the negative electrode charging relay are coupled to the circuit for vehicle travel. The junction box controller includes a temperature sensor that detects the temperature of the circuit for vehicle travel, and a controller that, when the temperature of the circuit for vehicle travel detected by the temperature sensor reaches or exceeds a preset threshold, controls and switches on either of the positive electrode charging relay and the negative electrode charging relay.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Figure 1:
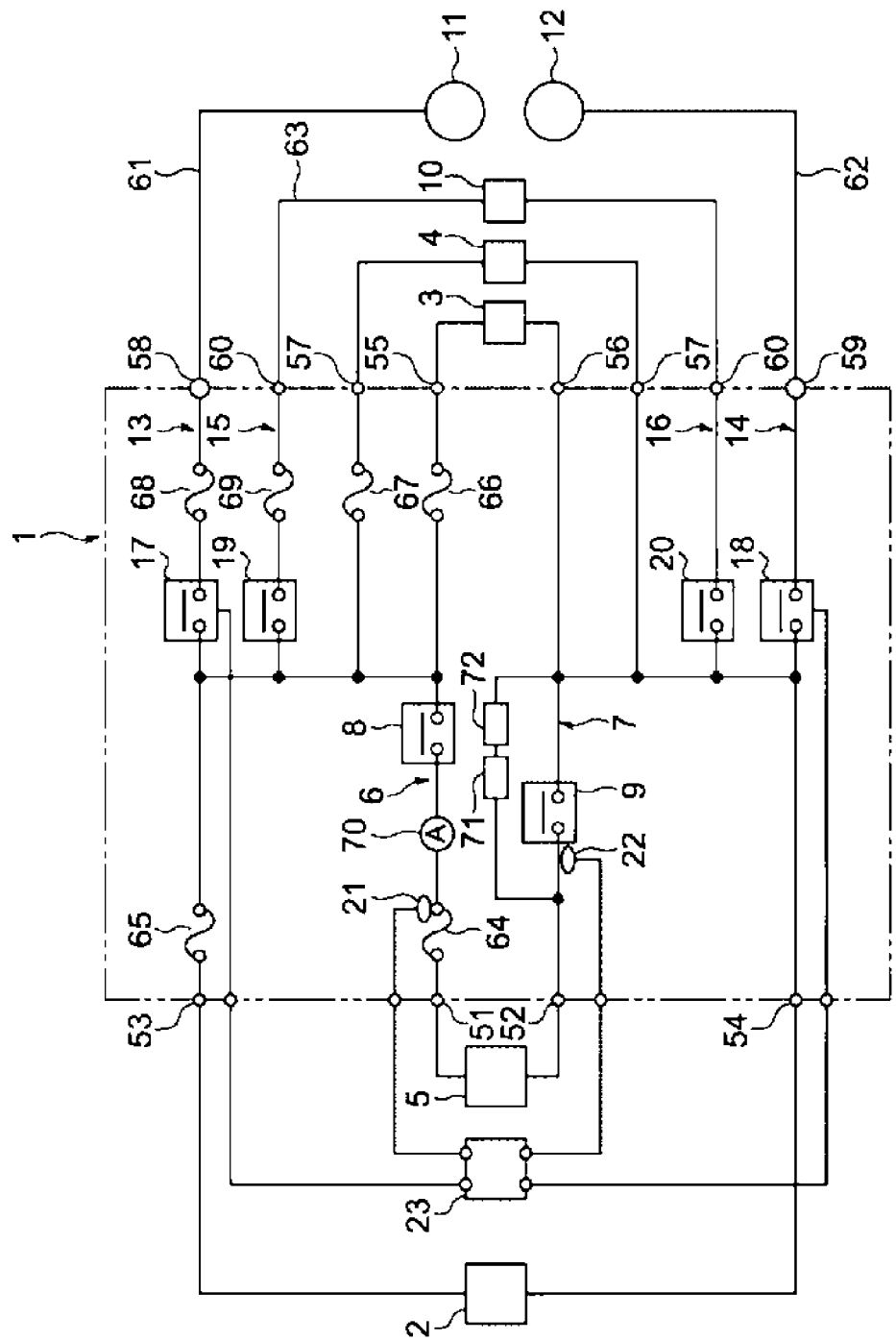
FIG. 1 is a schematic block diagram illustrating an embodiment of the electrical components of an electrified vehicle that employs a junction box controller according to the disclosure.

In the following, a preferred but non-limiting embodiment of the disclosure is described in detail with reference to the accompanying drawings. Note that sizes, materials, specific values, and any other factors illustrated in the embodiment are illustrative for easier understanding of the disclosure, and are not intended to limit the scope of the disclosure unless otherwise specifically stated. Further, elements in the following example embodiment which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale. For example, as described in JP-A No. 2012-196007, for an electrified vehicle including a motor generator and a battery for vehicle travel, when starting a system, a main fuse and a main relay are always energized. The contacts of the main fuse and the contacts of the main relay have electrical resistance, and power flowing between the battery for vehicle travel and the motor generator is high-voltage, high-current power. Thus, the temperature of the main fuse in an on-state and the temperature of the main relay in an on-state increase. When the main fuse and the main relay overheat, there is a possibility of the fuse element of the main fuse blowing and a possibility of the contacts of the main relay being welded together. Accordingly, in conventional techniques, the temperature of a circuit for vehicle travel, or more specifically, the temperature of a main relay, is monitored. When the temperature of the circuit for vehicle travel reaches or exceeds a predetermined temperature, the following measures are taken to decrease the temperature of the main relay, that is, the temperature of the circuit for vehicle travel. For example, a limit is set for the amount of power from the battery for vehicle travel used for vehicle travel. For a hybrid vehicle, the ratio of the driving force of an engine to the power of the battery for vehicle travel is increased, that is, the amount of power from the battery for vehicle travel used for vehicle travel is decreased.

However, the above ways to cool the circuit for vehicle travel may cause the following problems. If a limit is set for the amount of power from the battery for vehicle travel used for vehicle travel, there is a possibility that the vehicle acceleration and deceleration desired by a driver are not achieved. For the hybrid vehicle, an increase in the ratio of the driving force of the engine to the power of the battery for vehicle travel may result in decreased fuel efficiency and increased exhaust emissions. There is a technique of absorbing the heat of the circuit for vehicle travel by using a heat absorption sheet, which, however, leads to an increased number of components and increased costs. Thus, since electrified vehicles, whose charging is done by coupling a battery for vehicle travel to an external charging power source, are widely used, a junction box controller capable of efficiently decreasing the temperature of a circuit for vehicle travel is widely called for, the junction box controller being included in an electrified vehicle in which the interior of a junction box has charging relays.

The disclosure has been made in view of the above problems, and it is desirable to provide a junction box controller capable of efficiently decreasing the temperature of a circuit for vehicle travel of an electrified vehicle in which the interior of a junction box has charging relays. FIG. 1 is a schematic block diagram of the electrical components of an electrified vehicle that employs a junction box controller in the embodiment and that is a plug-in hybrid vehicle. As in the case of existing plug-in hybrid vehicles, the plug-in hybrid vehicle includes both an engine (not illustrated) and a motor generator (not illustrated) for driving the vehicle. In this embodiment, as the motor generators, the plug-in hybrid vehicle includes a front motor generator for driving the front wheels of the vehicle and a rear motor generator for driving the rear wheels of the vehicle. In FIG. 1, a front electrical component 2 for vehicle travel (hereinafter, referred to as front electrical component 2) includes the front motor generator, and a rear electrical component 3 for vehicle travel (hereinafter, referred to as rear electrical component 3) includes the rear motor generator. Thus, the front electrical component 2 includes an electrical component such as an inverter (driving circuit) (not illustrated) that controls driving power supplied to, for example, the front motor generator. Likewise, the rear electrical component 3 includes an electrical component such as an inverter (driving circuit) (not illustrated) that controls driving power supplied to, for example, the rear motor generator.

The driving force of the engine in this embodiment and, for example, the driving force of the front motor generator are used in a coordinated manner to drive the front wheels. As in the case of typical vehicles, the plug-in hybrid vehicle in this embodiment includes an auxiliary battery, which is, for example, a 12-volt battery, inside a common electrical component 4 illustrated in FIG. 1. With the power of the auxiliary battery, devices such as a starter motor for starting the engine, an air conditioner, an audio-visual system, and lights are able to operate. Thus, the common electrical component 4 includes these electrical components and a DC-DC converter that decreases the voltage of a battery 5 for vehicle travel (hereinafter, referred to as battery 5), which is described later, to around the voltage of the auxiliary battery. In the description below, the front electrical component 2, the rear electrical component 3, and the common electrical component 4 may be collectively referred to as vehicle electrical components.

Figure 2:
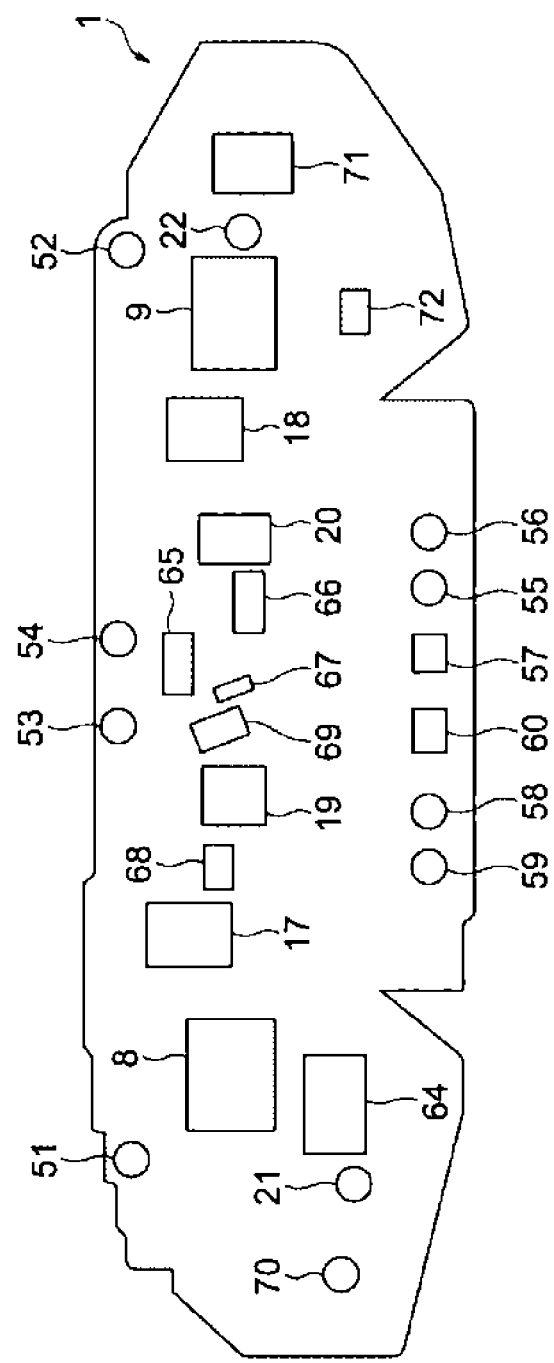
FIG. 2 is a plan view illustrating a schematic configuration inside a junction box in FIG. 1.

The plug-in hybrid vehicle includes the battery 5 that supplies power to the front electrical component 2, more specifically, the front motor generator, and to the rear electrical component 3, more specifically, the rear motor generator. As described above, the motor generators for driving the vehicle have high-voltage, high-current characteristics, and accordingly, the battery 5 has high-voltage, high-capacity characteristics. The interior of a junction box 1 has circuits for vehicle travel that supply power from the battery 5 to the front electrical component 2, the rear electrical component 3, and the common electrical component 4. One of the circuits for vehicle travel is a positive electrode circuit 6 for vehicle travel (hereinafter, referred to as positive electrode circuit 6) provided for the positive electrode of the battery 5, and the other is a negative electrode circuit 7 for vehicle travel (hereinafter, referred to as negative electrode circuit 7) provided for the negative electrode of the battery 5. The positive electrode circuit 6 has a positive electrode main relay 8 for providing circuit connection and disconnection. Meanwhile, the negative electrode circuit 7 has a negative electrode main relay 9 for providing circuit connection and disconnection. FIG. 2 is a schematic layout of main components inside the junction box 1 that are to be energized.

The positive electrode of the battery 5 is coupled to the positive electrode circuit 6 via a battery positive electrode terminal 51, and the negative electrode of the battery 5 is coupled to the negative electrode circuit 7 via a battery negative electrode terminal 52. The front electrical component 2 is coupled to the positive electrode circuit 6 via a front positive electrode terminal 53 and coupled to the negative electrode circuit 7 via a front negative electrode terminal 54. The rear electrical component 3 is coupled to the positive electrode circuit 6 via a rear positive electrode terminal 55 and coupled to the negative electrode circuit 7 via a rear negative electrode terminal 56. The common electrical component 4 is coupled to the positive electrode circuit 6 and the negative electrode circuit 7 via common electrical component connectors 57.

To charge the battery 5 with power supplied from an external charging power source, the plug-in hybrid vehicle includes a charger for external coupling 10, a positive electrode terminal for external coupling 11, and a negative electrode terminal for external coupling 12. The charger for external coupling 10, in which a commercial power source is used as the external charging power source, includes an AC-DC converter. The positive electrode terminal for external coupling 11 is coupled to the positive electrode of a fast-charging power source (not illustrated), and the negative electrode terminal for external coupling 12 is coupled to the negative electrode of the fast-charging power source. The interior of the junction box 1 has charging circuits 13 to 16 for coupling the battery 5 to these external charging power sources. Specifically, the charging circuit 13 is a positive electrode fast-charging circuit 13 for coupling the positive electrode of the battery 5 to the positive electrode of the fast-charging power source. The charging circuit 14 is a negative electrode fast-charging circuit 14 for coupling the negative electrode of the battery 5 to the negative electrode of the fast-charging power source. The charging circuit 15 is a positive electrode normal charging circuit 15 for coupling the positive electrode of the battery 5 to the positive electrode of the charger for external coupling 10. The charging circuit 16 is a negative electrode normal charging circuit 16 for coupling the negative electrode of the battery 5 to the negative electrode of the charger for external coupling 10.

Both the positive electrode fast-charging circuit 13 and the positive electrode normal charging circuit 15 are coupled to the positive electrode circuit 6 on one side of the positive electrode main relay 8. Here, the battery 5 is provided on the opposite side of the positive electrode main relay 8. Both the negative electrode fast-charging circuit 14 and the negative electrode normal charging circuit 16 are coupled to the negative electrode circuit 7 on one side of the negative electrode main relay 9. Here, the battery 5 is provided on the opposite side of the negative electrode main relay 9. That is, the charging circuits 13 to 16 are coupled to the battery 5 via a portion of the positive electrode circuit 6 and a portion of the negative electrode circuit 7. The positive electrode fast-charging circuit 13 includes a positive electrode fast-charging relay 17, and the negative electrode fast-charging circuit 14 includes a negative electrode fast-charging relay 18. The positive electrode normal charging circuit 15 includes a positive electrode normal charging relay 19, and the negative electrode normal charging circuit 16 includes a negative electrode normal charging relay 20.

The positive electrode terminal for external coupling 11 is coupled to the positive electrode fast-charging circuit 13 via a positive electrode fast-charging terminal 58. The negative electrode terminal for external coupling 12 is coupled to the negative electrode fast-charging circuit 14 via a negative electrode fast-charging terminal 59. The charger for external coupling 10 is coupled to the positive electrode normal charging circuit 15 and the negative electrode normal charging circuit 16 via charger connectors 60. It should be noted that since, as is well known, the fast-charging power source is, for example, a high-voltage, direct-current power source, each of a positive electrode fast-charging wiring material 61 and a negative electrode fast-charging wiring material 62 is an electric wire having a large conductor cross-sectional area. The positive electrode fast-charging wiring material 61 couples the positive electrode fast-charging terminal 58 to the positive electrode terminal for external coupling 11. The negative electrode fast-charging wiring material 62 couples the negative electrode fast-charging terminal 59 to the negative electrode terminal for external coupling 12. In contrast, a charger wiring material 63 for coupling the charger connectors 60 to the charger for external coupling 10 is an electric wire not having a particularly large conductor cross-sectional area.

In the positive electrode circuit 6, a main fuse 64 is provided between the positive electrode main relay 8 and the battery 5. A front fuse 65 is provided between the positive electrode main relay 8 and the front electrical component 2. A rear fuse 66 is provided between the positive electrode main relay 8 and the rear electrical component 3. An auxiliary fuse 67 is provided between the positive electrode main relay 8 and the common electrical component 4. A fast-charging fuse 68 is provided between the positive electrode fast-charging relay 17 and the positive electrode terminal for external coupling 11. A normal charging fuse 69 is provided between the positive electrode normal charging relay 19 and the charger for external coupling 10.

A current sensor 70 is provided between the positive electrode main relay 8 and the main fuse 64. In addition, as a temperature sensor for detecting the temperature of a circuit for vehicle travel, a temperature sensor 21 for detecting the temperature of the positive electrode circuit 6 (hereinafter, referred to as positive electrode circuit temperature sensor 21) is provided near the main fuse 64. As another temperature sensor for detecting the temperature of a circuit for vehicle travel, a temperature sensor 22 for detecting the temperature of the negative electrode circuit 7 (hereinafter, referred to as negative electrode circuit temperature sensor 22) is provided near the negative electrode main relay 9. The output value of the positive electrode circuit temperature sensor 21 and the output value of the negative electrode circuit temperature sensor 22 are input to a controller 23, which is described later. The negative electrode circuit 7 includes a pre-charge circuit bypassing the negative electrode main relay 9, and the pre-charge circuit includes a pre-charge relay 71 and a pre-charge resistor 72. As is well known, the pre-charge circuit including the pre-charge relay 71 and the pre-charge resistor 72 has the role of protecting the positive electrode main relay 8 and the negative electrode main relay 9 from being subjected to abrupt application of a current by switching on the pre-charge relay 71 before switching on the positive electrode main relay 8 and the negative electrode main relay 9, causing a current to flow through the pre-charge resistor 72 to obtain a low current, and applying the low current to the positive electrode main relay 8 and the negative electrode main relay 9.

Inside the junction box 1, a bus bar is used as a wiring material. As described above, since having a large cross-sectional area in the direction orthogonal to the direction in which a current flows, a bus bar made of a metal bar (metal plate) has low electrical resistance. In addition, the bus bar, which is uninsulated, has high heat dissipation performance and is thus a suitable material through which a high current may flow. In this embodiment, three-phase motors are used as the motor generators, for example. However, since the power of the battery 5 is direct-current power, the inverter (driving circuit) converts the direct-current power into three-phase power and supplies the three-phase power to the motor generators. For regenerative operation of the motor generators, the inverter works vice versa, that is, converts three-phase power into direct-current power and supplies the direct-current power to the battery 5.

As in the case of recent vehicles, and in the plug-in hybrid vehicle in this embodiment, an engine controller controls the operation status of the engine, and the controller 23 controls the operation status of the motor generators, for example, powering operation and regenerative operation. The plug-in hybrid vehicle may include a comprehensive power controller that controls the entire driving force of the vehicle. The plug-in hybrid vehicle may also include a battery controller for controlling the battery 5. These controllers each include a computer system like a microcomputer. As in the case of well-known computer systems, the computer system includes not only a processor having a high processing function but also, for example, storage for storing a program and an input/output device for reading sensor signals and for communicating with other controllers.

In addition to controlling of power supply from the inverter (driving circuit) to the motor generators, the controller 23 performs on-off control of the positive electrode main relay 8, the negative electrode main relay 9, the positive electrode fast-charging relay 17, the negative electrode fast-charging relay 18, the positive electrode normal charging relay 19, and the negative electrode normal charging relay 20.

Figure 3:
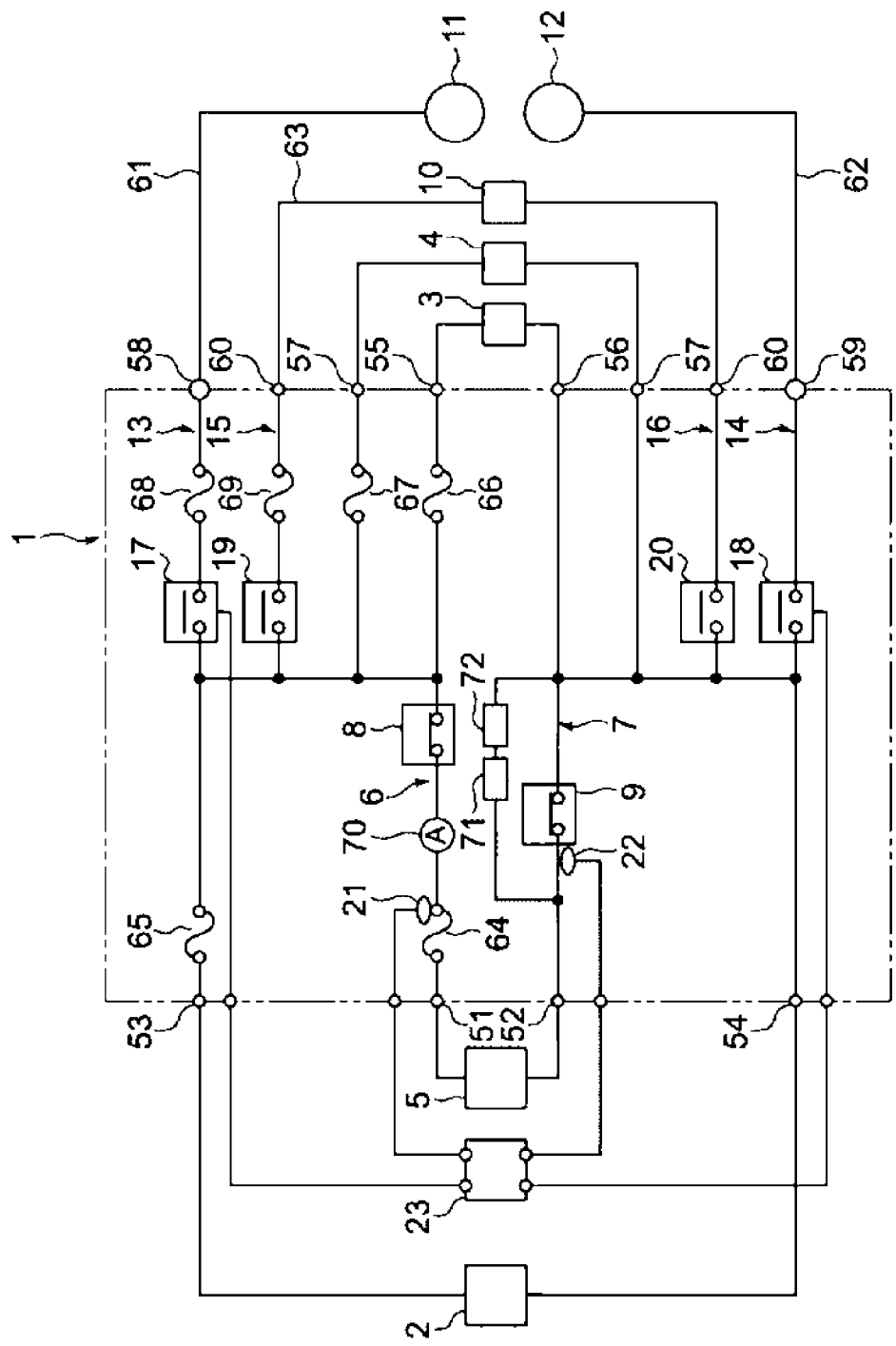
FIG. 3 illustrates an operating state of relays when starting a system in FIG. 1.

FIG. 3 illustrates typical operation of the positive electrode main relay 8, the negative electrode main relay 9, the positive electrode fast-charging relay 17, the negative electrode fast-charging relay 18, the positive electrode normal charging relay 19, and the negative electrode normal charging relay 20, for which the controller 23 performs the on-off control. FIG. 3 illustrates a state in which the system of the vehicle has started, that is, a state in which the vehicle can travel. In the state in which the system has started, the positive electrode main relay 8 and the negative electrode main relay 9 are switched on, and the positive electrode fast-charging relay 17, the negative electrode fast-charging relay 18, the positive electrode normal charging relay 19, and the negative electrode normal charging relay 20 are switched off. Meanwhile, when the system of the vehicle is stopped and when the external fast-charging power source is coupled to the positive electrode fast-charging circuit 13 and the negative electrode fast-charging circuit 14, although not illustrated, the positive electrode fast-charging relay 17 and the negative electrode fast-charging relay 18 as well as the positive electrode main relay 8 and the negative electrode main relay 9 are switched on, and the positive electrode normal charging relay 19 and the negative electrode normal charging relay 20 are switched off. Likewise, when the system as a vehicle is stopped and when the commercial power source is coupled to the positive electrode normal charging circuit 15 and the negative electrode normal charging circuit 16 via the charger for external coupling 10, although not illustrated, the positive electrode normal charging relay 19 and the negative electrode normal charging relay 20 as well as the positive electrode main relay 8 and the negative electrode main relay 9 are switched on, and the positive electrode fast-charging relay 17 and the negative electrode fast-charging relay 18 are switched off.

Figure 4:
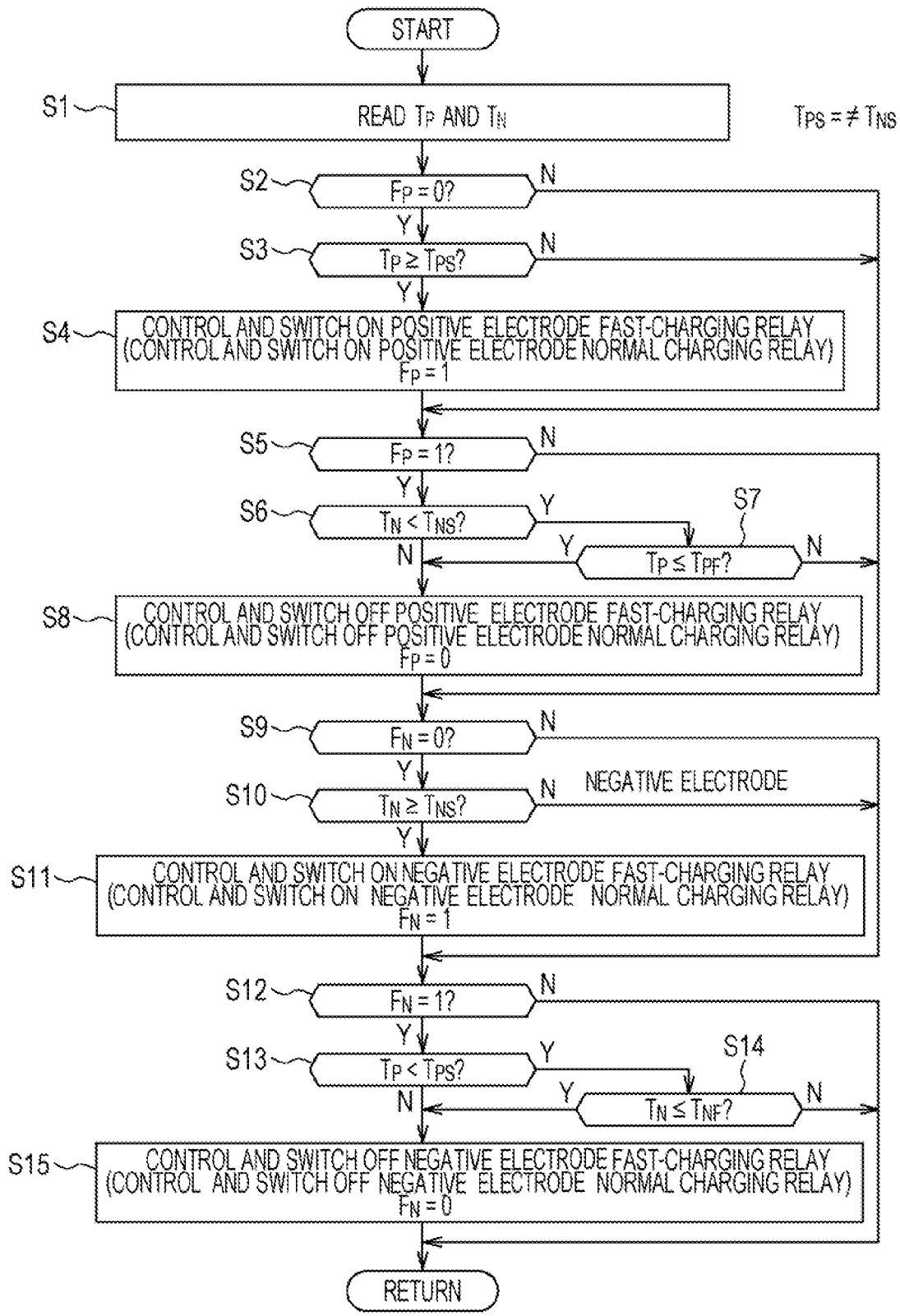
FIG. 4 is a flowchart of arithmetic processing performed by a controller in FIG. 1.

FIG. 4 is a flowchart illustrating the arithmetic processing that, for example, the controller 23 performs to cool the positive electrode circuit 6 and the negative electrode circuit 7 for the purpose of protecting the positive electrode main relay 8 and the negative electrode main relay 9 from overheating. When starting the system of the vehicle, the arithmetic processing is performed as, for example, timer interruption processing performed according to a predetermined sampling cycle. In step S1, a temperature $T_P$ of the positive electrode circuit 6 (hereinafter, referred to as positive electrode circuit temperature $T_P$) detected by the positive electrode circuit temperature sensor 21 and a temperature $T_N$ of the negative electrode circuit 7 (hereinafter, referred to as negative electrode circuit temperature $T_N$) detected by the negative electrode circuit temperature sensor 22 are read.

In step S2, whether a flag $F_P$ regarding cooling of the positive electrode circuit 6 (hereinafter, referred to as flag $F_P$) indicates a reset state represented by 0 is determined. If the flag $F_P$ indicates the reset state, the processing proceeds to step S3. Otherwise, the processing proceeds to step S5.

In step S3, whether the positive electrode circuit temperature $T_P$ read in step S1 is equal to or greater than a threshold $T_{PS}$ for starting cooling of the positive electrode circuit 6 (hereinafter, referred to as threshold $T_{PS}$) is determined. If the positive electrode circuit temperature $T_P$ is equal to or greater than the threshold $T_{PS}$, the processing proceeds to step S4. Otherwise, the processing proceeds to step S5.

In step S4, the positive electrode fast-charging relay 17 is controlled and switched on, and the flag $F_P$ is set to a set state represented by 1. Then, the processing proceeds to step S5. It should be noted that in step S4, as described later, the positive electrode fast-charging relay 17 and the positive electrode normal charging relay 19 may be controlled together and switched on concurrently. Alternatively, instead of the positive electrode fast-charging relay 17, only the positive electrode normal charging relay 19 may be controlled and switched on.

In step S5, whether the flag $F_P$ indicates the set state represented by 1 is determined. If the flag $F_P$ indicates the set state, the processing proceeds to step S6. Otherwise, the processing proceeds to step S9.

In step S6, whether the negative electrode circuit temperature $T_N$ read in step S1 is less than a threshold $T_{NS}$ for starting cooling of the negative electrode circuit 7 (hereinafter, referred to as threshold $T_{NS}$), which is described later, is determined. If the negative electrode circuit temperature $T_N$ is less than the threshold $T_{NS}$, the processing proceeds to step S7. Otherwise, the processing proceeds to step S8.

In step S7, whether the positive electrode circuit temperature $T_P$ read in step S1 reaches or falls below a threshold $T_{PF}$ for stopping cooling of the positive electrode circuit 6 (hereinafter, referred to as threshold $T_{PF}$) is determined. If the positive electrode circuit temperature $T_P$ is equal to or less than the threshold $T_{PF}$, the processing proceeds to step S8. Otherwise, the processing proceeds to step S9. It should be noted that the temperature value of the threshold $T_{PF}$ is sufficiently smaller than that of the threshold $T_{PS}$.

In step S8, the positive electrode fast-charging relay 17 is controlled and switched off, and the flag $F_P$ is set to the reset state represented by 0. Then, the processing continues. It should be noted that if in step S4 the positive electrode fast-charging relay 17 and the positive electrode normal charging relay 19 are controlled and switched on concurrently, then in step S8 both the positive electrode fast-charging relay 17 and the positive electrode normal charging relay 19 are controlled and switched off concurrently. If only the positive electrode normal charging relay 19 is controlled and switched on in step S4, the positive electrode normal charging relay 19 is controlled and switched off.

In step S9, whether a flag $F_N$ regarding cooling of the negative electrode circuit 7 (hereinafter, referred to as flag $F_N$) indicates the reset state represented by 0 is determined. If the flag $F_N$ indicates the reset state, the processing proceeds to step S10. Otherwise, the processing proceeds to step S12.

In step S10, the negative electrode circuit temperature $T_N$ read in step S1 is equal to or greater than the threshold $T_{NS}$ is determined. If the negative electrode circuit temperature $T_N$ is equal to or greater than the threshold $T_{NS}$, the processing proceeds to step S11. Otherwise, the processing proceeds to step S12.

In step S11, the negative electrode fast-charging relay 18 is controlled and switched on, and the flag $F_N$ is set to the set state represented by 1. Then, the processing proceeds to step S12. It should be noted that in step S11, as described later, the negative electrode fast-charging relay 18 and the negative electrode normal charging relay 20 may be controlled together and switched on concurrently. Alternatively, instead of the negative electrode fast-charging relay 18, only the negative electrode normal charging relay 20 may be controlled and switched on.

In step S12, whether the flag $F_N$ indicates the set state represented by 1 is determined. If the flag $F_N$ indicates the set state, the processing proceeds to step S13. Otherwise, the processing returns to the start of the flowchart.

In step S13, whether the positive electrode circuit temperature $T_P$ read in step S1 is less than the threshold $T_{PS}$ is determined. If the positive electrode circuit temperature $T_P$ is less than the threshold $T_{PS}$, the processing proceeds to step S14. Otherwise the processing proceeds to step S15.

In step S14, whether the negative electrode circuit temperature $T_N$ read in step S1 reaches or falls below a threshold $T_{NF}$ for stopping cooling of the negative electrode circuit 7 (hereinafter, referred to as threshold $T_{NF}$) is determined. If the negative electrode circuit temperature $T_N$ is equal to or less than the threshold $T_{NF}$, the processing proceeds to step S15. Otherwise, the processing returns to the start of the flowchart. It should be noted that the temperature value of the threshold $T_{NF}$ is sufficiently smaller than that of the threshold $T_{NS}$. The threshold $T_{NS}$ and the threshold $T_{PF}$ may represent the same temperature value or different temperature values.

In step S15, the negative electrode fast-charging relay 18 is controlled and switched off, and the flag $F_N$ is set to the reset state represented by 0. Then, the processing returns to the start of the flowchart. It should be noted that if in step S11 the negative electrode fast-charging relay 18 and the negative electrode normal charging relay 20 are controlled and switched on concurrently, then in step S15 the negative electrode fast-charging relay 18 and the negative electrode normal charging relay 20 are controlled and switched off concurrently. If only the negative electrode normal charging relay 20 is controlled and switched on in step S11, the negative electrode normal charging relay 20 is controlled and switched off.

Figure 5:
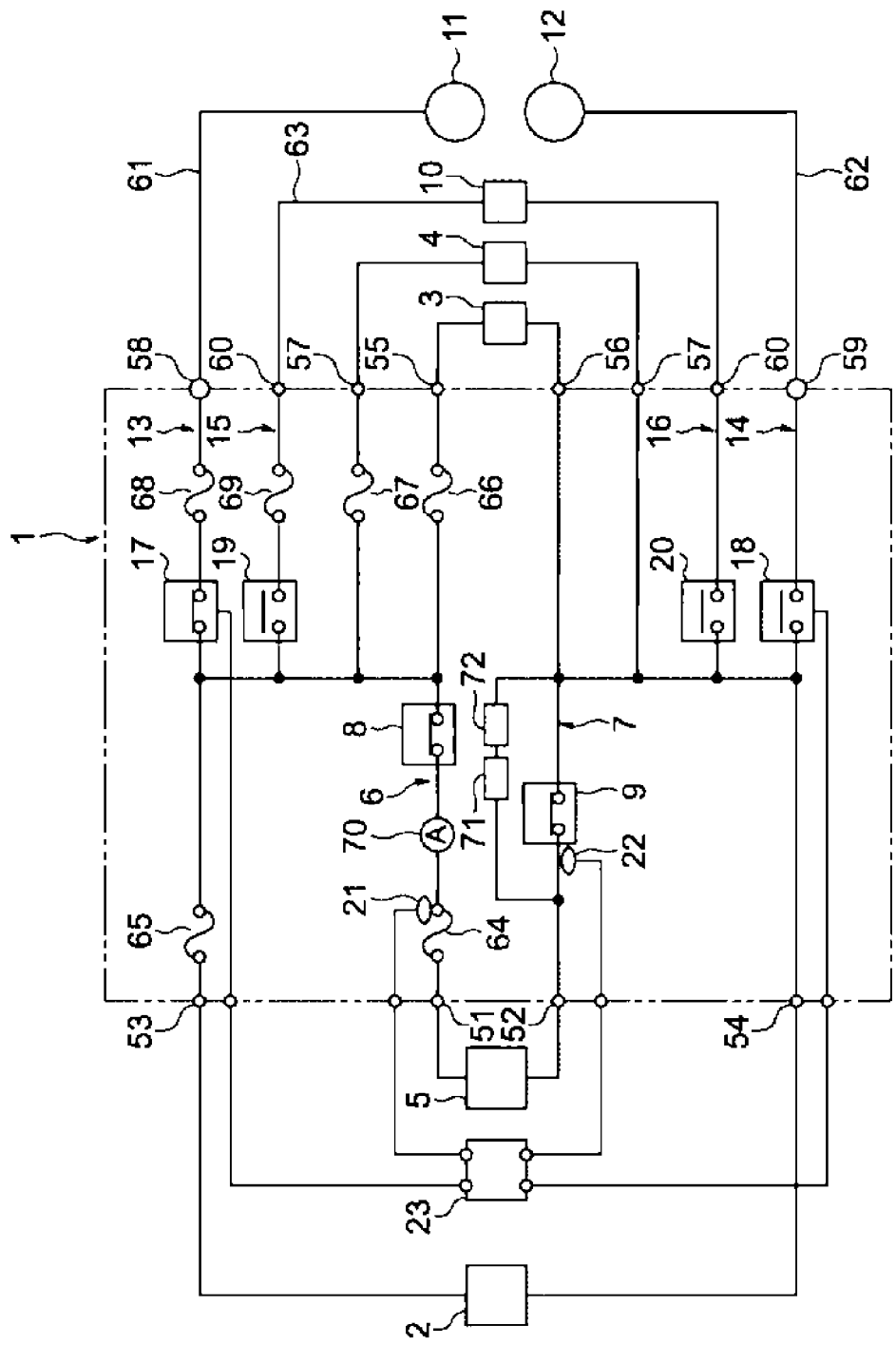
FIG. 5 illustrates an example of the operating state of the relays in FIG. 1 caused by the arithmetic processing in FIG. 4.
Figure 6:
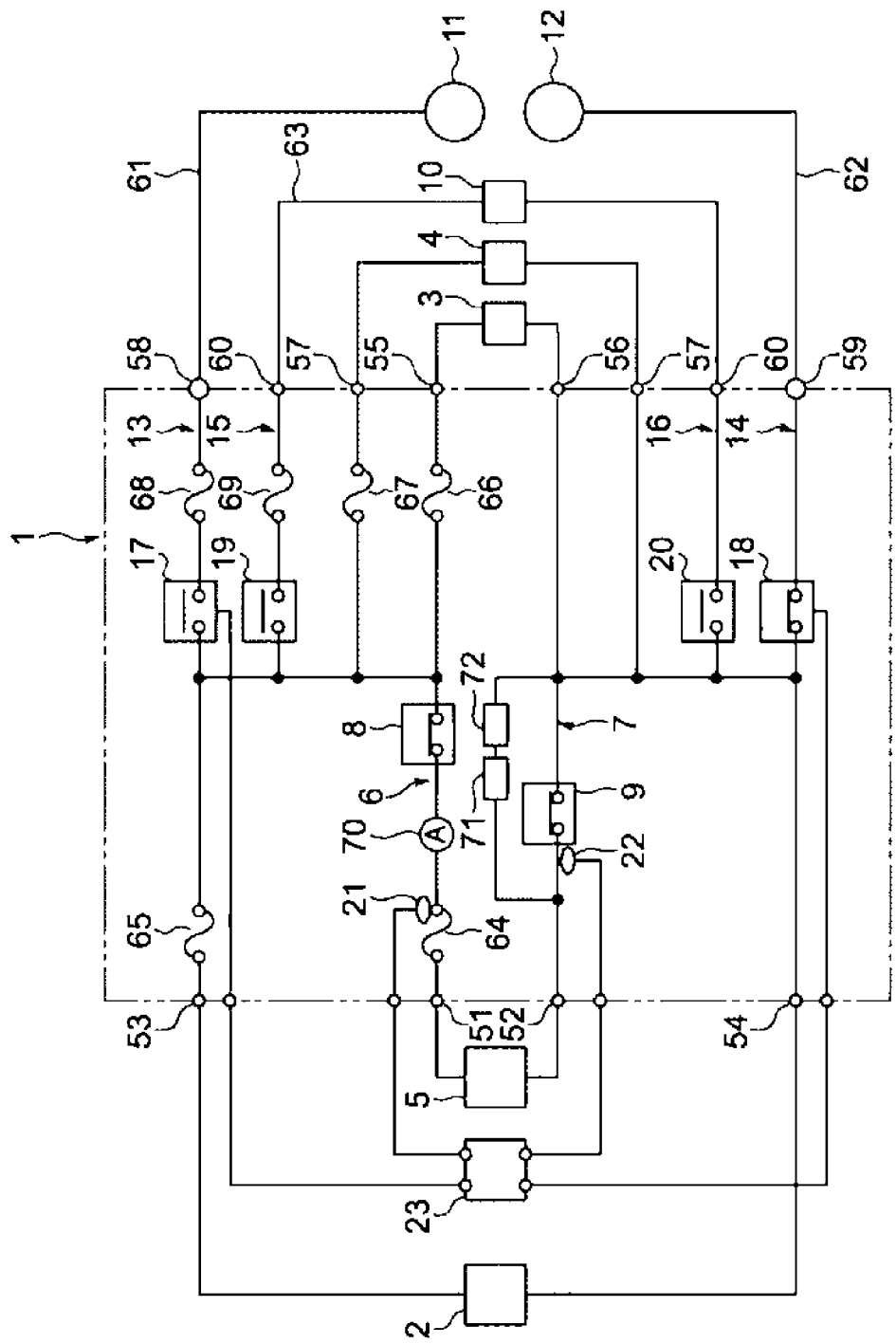
FIG. 6 illustrates another example of the operating state of the relays in FIG. 1 caused by the arithmetic processing in FIG. 4.

According to the arithmetic processing, when the positive electrode circuit temperature $T_P$ of the positive electrode circuit 6 reaches or exceeds the threshold $T_{PS}$, the positive electrode fast-charging relay 17 is controlled and switched on. Then, when the positive electrode circuit temperature $T_P$ reaches or falls below the threshold $T_{PF}$, the positive electrode fast-charging relay 17 is controlled and switched off. FIG. 5 illustrates the state in which the positive electrode fast-charging relay 17 is controlled and switched on in accordance with the arithmetic processing in FIG. 4 while the positive electrode main relay 8 and the negative electrode main relay 9 are in an on-state. According to the arithmetic processing in FIG. 4, when the negative electrode circuit temperature $T_N$ of the negative electrode circuit 7 reaches or exceeds the threshold $T_{NS}$, the negative electrode fast-charging relay 18 is controlled and switched on. Then, when the negative electrode circuit temperature $T_N$ reaches or falls below the threshold $T_{NF}$, the negative electrode fast-charging relay 18 is controlled and switched off. FIG. 6 illustrates the state in which the negative electrode fast-charging relay 18 is controlled and switched on in accordance with the arithmetic processing in FIG. 4 while the positive electrode main relay 8 and the negative electrode main relay 9 are in an on-state.

For example, as described above, the contacts of the positive electrode main relay 8 and the contacts of the negative electrode main relay 9 have electrical resistance (needless to say, although the remaining portions of the relays also have electrical resistance, the contacts have higher electrical resistance than the remaining portions). Thus, when the positive electrode main relay 8 and the negative electrode main relay 9 in an on-state are energized, Joule heat is generated in the contacts, leading to an increase in the temperature of the positive electrode main relay 8 and the temperature of the negative electrode main relay 9. The higher the load or rotation speed of the motor generators, the higher the temperature rise. The heat of the positive electrode main relay 8 is transferred to the positive electrode circuit 6, leading to an increase in the temperature of the positive electrode circuit 6, and the heat of the negative electrode main relay 9 is transferred to the negative electrode circuit 7, leading to an increase in the temperature of the negative electrode circuit 7.

As described above, while the positive electrode fast-charging relay 17 is in an on-state, the positive electrode circuit 6 extends up to the positive electrode fast-charging circuit 13. Thus, the heat of the positive electrode circuit 6 is transferred to the bus bar of the positive electrode fast-charging circuit 13 and the positive electrode fast-charging wiring material 61 provided further away from the positive electrode circuit 6. The bus bar and the positive electrode fast-charging wiring material 61 dissipate the heat, thereby cooling the positive electrode circuit 6. Likewise, while the negative electrode fast-charging relay 18 is in an on-state, the negative electrode circuit 7 extends up to the negative electrode fast-charging circuit 14. Thus, the heat of the negative electrode circuit 7 is transferred to the bus bar of the negative electrode fast-charging circuit 14 and the negative electrode fast-charging wiring material 62 provided further away from the negative electrode circuit 7. The bus bar and the negative electrode fast-charging wiring material 62 dissipate the heat, thereby cooling the negative electrode circuit 7. As described above, in addition to high heat transfer performance, the bus bars, which are uninsulated, have high heat dissipation performance. Each of the fast-charging wiring materials is an electric wire having a large conductor cross-sectional area. Thus, as in the case of the bus bars, the fast-charging wiring materials, in each of which an electric wire having a large conductor cross-sectional area is used, have high heat transfer performance. In addition, since being exposed to the outside air, the fast-charging wiring materials have high heat dissipation performance. Accordingly, while the positive electrode fast-charging relay 17 is in an on-state, the temperature of the positive electrode circuit 6 decreases relatively rapidly, and the positive electrode circuit 6 is cooled. While the negative electrode fast-charging relay 18 is in an on-state, the temperature of the negative electrode circuit 7 decreases relatively rapidly, and the negative electrode circuit 7 is cooled.

In the arithmetic processing in FIG. 4, for example, in the state in which only the positive electrode fast-charging relay 17 is controlled and switched on, when the negative electrode circuit temperature $T_N$ reaches or exceeds the threshold $T_{NS}$, the positive electrode fast-charging relay 17 is controlled and switched off. At this timing in the arithmetic processing, the negative electrode fast-charging relay 18 is controlled and switched on. Thus, the state in which only the negative electrode fast-charging relay 18 is in an on-state starts. Likewise, in the state in which only the negative electrode fast-charging relay 18 is controlled and switched on, when the positive electrode circuit temperature $T_P$ reaches or exceeds the threshold $T_{PS}$, the negative electrode fast-charging relay 18 is controlled and switched off. At this timing in the arithmetic processing, the positive electrode fast-charging relay 17 is controlled and switched on. Thus, the state in which only the positive electrode fast-charging relay 17 is in an on-state starts. That is, in this embodiment, the extension of the heat dissipation area of the positive electrode circuit 6 up to the positive electrode fast-charging circuit 13 and the extension of the heat dissipation area of the negative electrode circuit 7 up to the negative electrode fast-charging circuit 14 are made alternately. In this embodiment, for example, as illustrated in FIGS. 5 and 6, the positive electrode terminal for external coupling 11 and the negative electrode terminal for external coupling 12 are independent of each other. Thus, concurrent coupling of the positive electrode fast-charging circuit 13 and the negative electrode fast-charging circuit 14 to the battery 5 in the state in which the positive electrode terminal for external coupling 11 and the negative electrode terminal for external coupling 12 are not coupled to the positive electrode or the negative electrode of the fast-charging power source may cause a short circuit between the positive electrode terminal for external coupling 11 and the negative electrode terminal for external coupling 12. However, if either of the positive electrode fast-charging relay 17 and the negative electrode fast-charging relay 18 is controlled and switched on, a short circuit between the positive electrode terminal for external coupling 11 and the negative electrode terminal for external coupling 12 will not occur.

Figure 7:
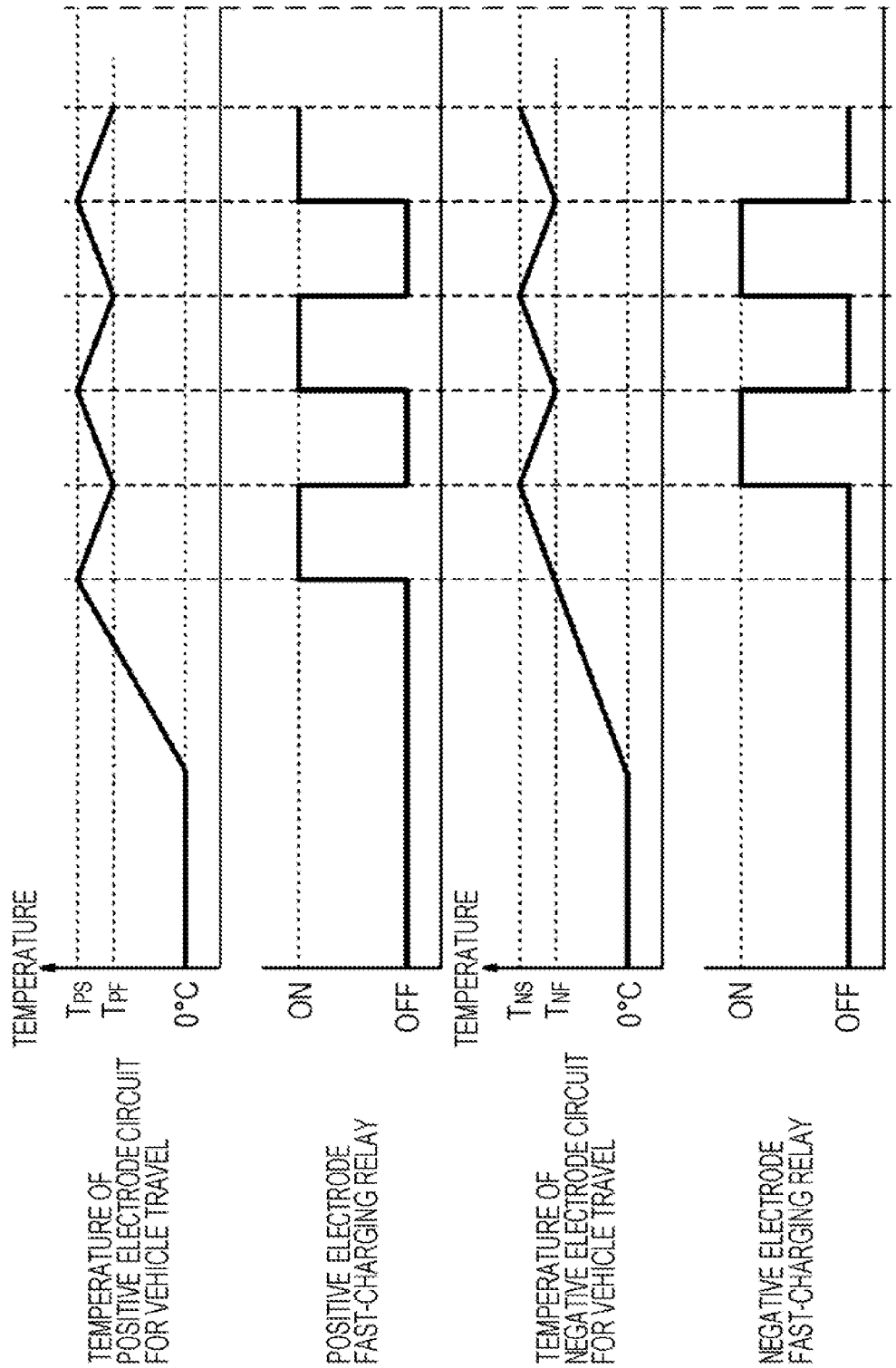
FIG. 7 is a timing chart illustrating the effects of the arithmetic processing in FIG. 4.

FIG. 7 is a timing chart illustrating the operation characteristics of the positive electrode fast-charging relay 17 and the negative electrode fast-charging relay 18 in the arithmetic processing in FIG. 4 and the changes in the positive electrode circuit temperature $T_P$ and the negative electrode circuit temperature $T_N$ as time elapses. It should be noted that the temperature axes (vertical axes) for the positive electrode circuit temperature $T_P$ and the negative electrode circuit temperature $T_N$ are represented with different reduction scales. The positive electrode circuit temperature $T_P$ and the negative electrode circuit temperature $T_N$ have roughly the same fluctuations unless there is no abnormality in the system. In this embodiment, the threshold $T_{PS}$ is set to, for example, 110 degrees Celsius, and the threshold $T_{NS}$ is set to, for example, 120 degrees Celsius (mere examples). Thus, normally, the positive electrode fast-charging relay 17 is switched on first, leading to a decrease in the positive electrode circuit temperature $T_P$. Then, the negative electrode fast-charging relay 18 is switched on, and at the time, the positive electrode fast-charging relay 17 is switched off. Accordingly, the state in which only the negative electrode fast-charging relay 18 is switched on is maintained, and the negative electrode circuit temperature $T_N$ decreases. In this state, when the amount of heat dissipation in the positive electrode circuit 6 has become insufficient, the positive electrode circuit temperature $T_P$ increases. With the temperature rise, the positive electrode fast-charging relay 17 is switched on. At this timing, the negative electrode fast-charging relay 18 is switched off. Then, the positive electrode fast-charging relay 17 and the negative electrode fast-charging relay 18 are controlled and switched on alternately. While the positive electrode fast-charging relay 17 is in an on-state, the positive electrode circuit temperature $T_P$ decreases. While the negative electrode fast-charging relay 18 is in an on-state, the negative electrode circuit temperature $T_N$ decreases. This enables efficient cooling of the positive electrode circuit 6 and the negative electrode circuit 7.

Thus, for the junction box controller in this embodiment, when the positive electrode circuit temperature $T_P$ inside the junction box 1 reaches or exceeds the threshold at which heat dissipation is considered necessary, the positive electrode fast-charging relay 17 is switched on, and when the negative electrode circuit temperature $T_N$ inside the junction box 1 reaches or exceeds the threshold at which heat dissipation is considered necessary, the negative electrode fast-charging relay 18 is switched on. Accordingly, the heat of the positive electrode circuit 6 is transferred to the positive electrode fast-charging circuit 13 and the positive electrode fast-charging wiring material 61 provided further away from the positive electrode circuit 6. Then, the positive electrode fast-charging circuit 13 and the positive electrode fast-charging wiring material 61 dissipate the heat. Meanwhile, the heat of the negative electrode circuit 7 is transferred to the negative electrode fast-charging circuit 14 and the negative electrode fast-charging wiring material 62 provided further away from the negative electrode circuit 7. Then, the negative electrode fast-charging circuit 14 and the negative electrode fast-charging wiring material 62 dissipate the heat. The bus bars used as the wiring materials in the junction box 1 have high heat transfer and dissipation performance. Thus, the bus bar of the positive electrode fast-charging circuit 13 dissipates the heat of the positive electrode circuit 6 rapidly, and bus bar of the negative electrode fast-charging circuit 14 dissipates the heat of the negative electrode circuit 7 rapidly. In addition, the positive electrode fast-charging wiring material 61 and the negative electrode fast-charging wiring material 62 dissipate the heat into the outside air. As a result, the positive electrode circuit 6 and the negative electrode circuit 7 are cooled rapidly. This system does not include a new device or structure.

Moreover, when controlling and switching on the positive electrode fast-charging relay 17 and the negative electrode fast-charging relay 18, either of the positive electrode fast-charging relay 17 and the negative electrode fast-charging relay 18 is switched on. Thus, in particular, it is possible to suppress an occurrence of a short circuit between the positive electrode terminal for external coupling 11 coupled to the positive electrode fast-charging circuit 13 and the negative electrode terminal for external coupling 12 coupled to the negative electrode fast-charging circuit 14.

When either of the temperature of the positive electrode circuit 6 and the temperature of the negative electrode circuit 7 reaches the threshold faster than the other, either of the positive electrode fast-charging relay 17 and the negative electrode fast-charging relay 18 that is provided in the circuit whose temperature has reached the threshold first is controlled and switched on. Subsequently, when the temperature of the other circuit has reached the threshold, the other of the positive electrode fast-charging relay 17 and the negative electrode fast-charging relay 18 that is provided in the other circuit is controlled and switched on. At the same time, either of the positive electrode fast-charging relay 17 and the negative electrode fast-charging relay 18 that has been controlled and switched on is controlled and switched off. Then, the on-off control is performed repeatedly. Thus, in accordance with the positive electrode circuit temperature $T_P$ and the negative electrode circuit temperature $T_N$, the positive electrode fast-charging relay 17 and the negative electrode fast-charging relay 18 are controlled and switched on alternately, which enables cooling of the positive electrode circuit 6 and the negative electrode circuit 7 in a balanced manner.

Figure 8:
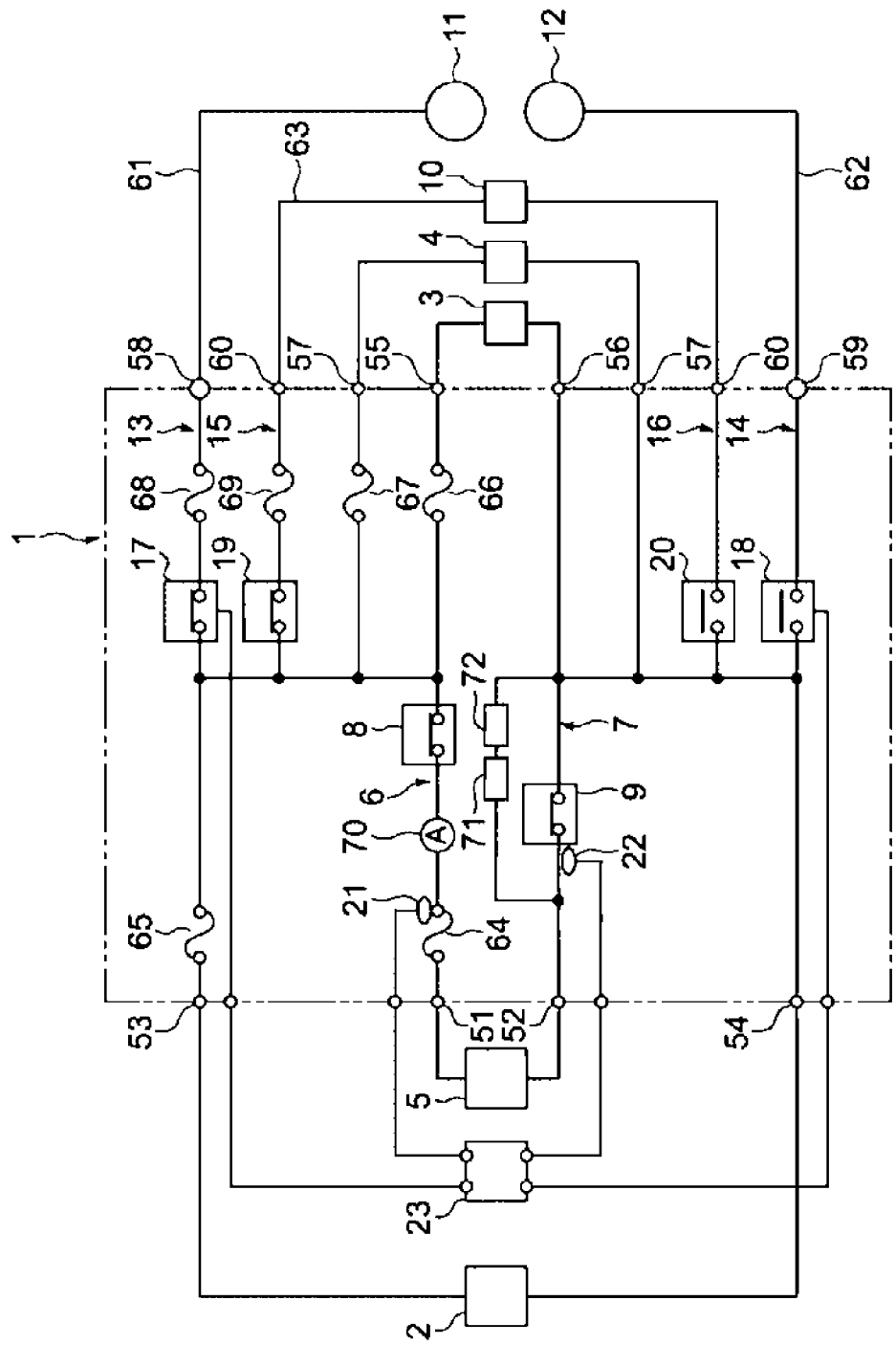
FIG. 8 illustrates an example of Variation 1 of the operating state of the relays in FIG. 1.
Figure 9:
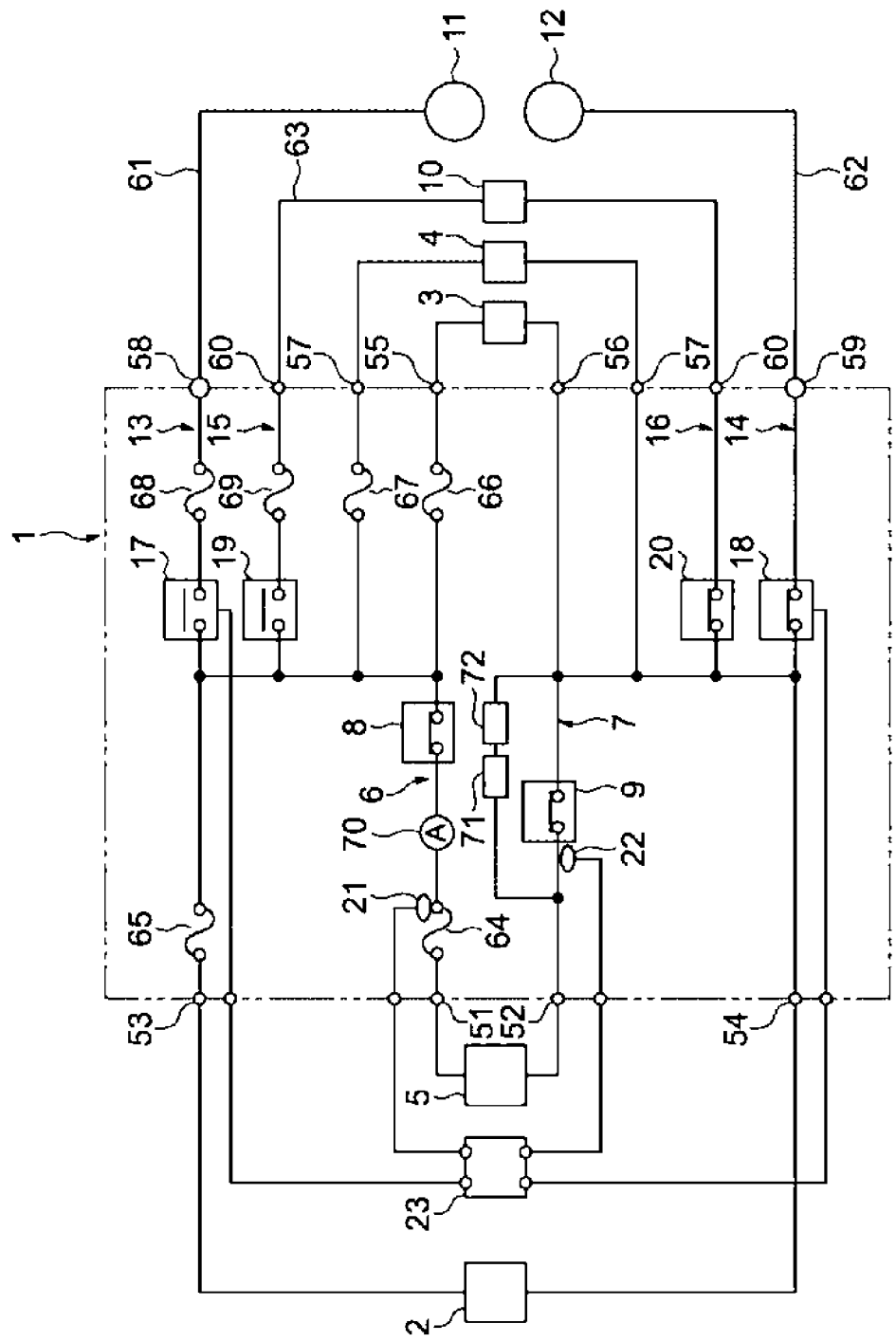
FIG. 9 illustrates another example of Variation 1 of the operating state of the relays in FIG. 1.

Some variations are considered regarding the control to switch on the positive electrode fast-charging relay 17 and the negative electrode fast-charging relay 18. For example, FIG. 8 illustrates an example of Variation 1 in which the positive electrode fast-charging relay 17 and the positive electrode normal charging relay 19 are controlled and switched on concurrently in step S4 of the arithmetic processing in FIG. 4. In this case, the heat dissipation area of the positive electrode circuit 6 not only includes the positive electrode fast-charging circuit 13 but also extends up to the positive electrode normal charging circuit 15 and the charger wiring material 63 provided further away from the positive electrode circuit 6. Thus, it is possible to obtain better cooling characteristics of the positive electrode circuit 6. Likewise, FIG. 9 illustrates another example of Variation 1 in which the negative electrode fast-charging relay 18 and the negative electrode normal charging relay 20 are controlled and switched on concurrently in step S11 of the arithmetic processing in FIG. 4. In this case, the heat dissipation area of the negative electrode circuit 7 not only includes the negative electrode fast-charging circuit 14 but also extends up to the negative electrode normal charging circuit 16 and the charger wiring material 63 provided further away from the negative electrode circuit 7. Thus, it is possible to obtain better cooling characteristics of the negative electrode circuit 7.

Figure 10:
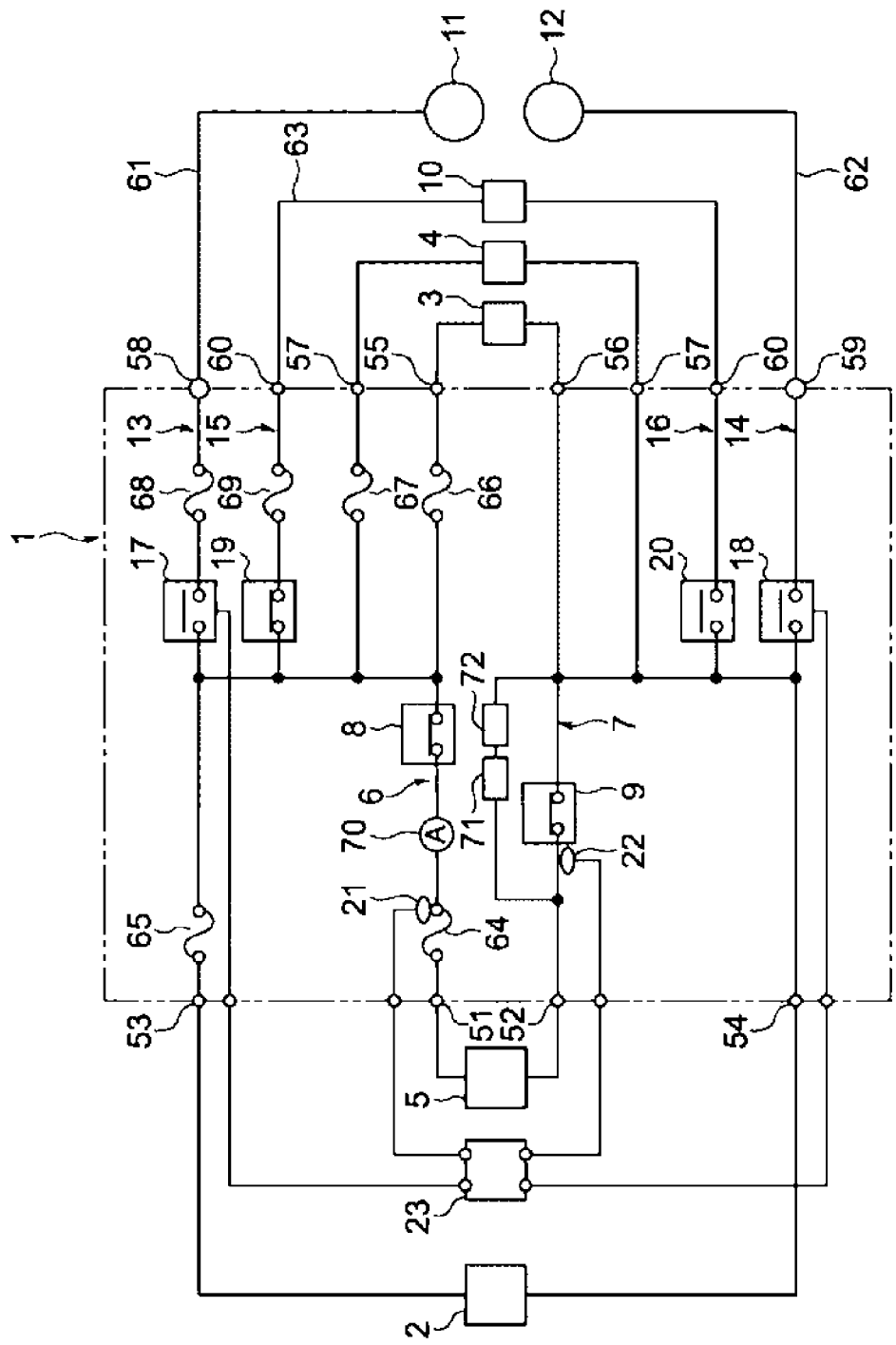
FIG. 10 illustrates an example of Variation 2 of the operating state of the relays in FIG. 1.
Figure 11:
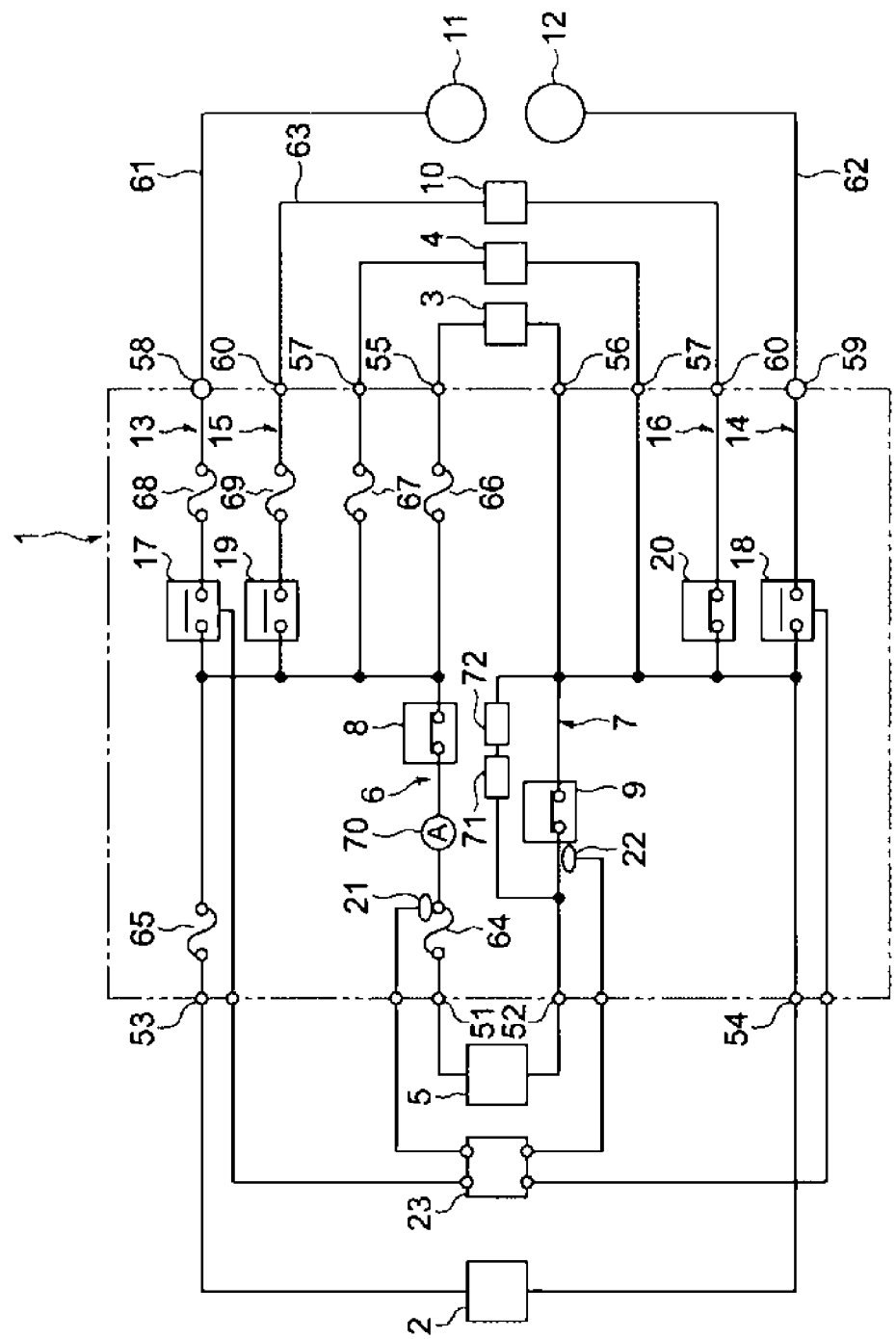
FIG. 11 illustrates another example of Variation 2 of the operating state of the relays in FIG. 1.

FIG. 10 illustrates an example of Variation 2 in which only the positive electrode normal charging relay 19 is controlled and switched on in step S4 of the arithmetic processing in FIG. 4. In this case, the heat dissipation area of the positive electrode circuit 6 extends up to the positive electrode normal charging circuit 15 and the charger wiring material 63. As described above, the conductor cross-sectional area of the charger wiring material 63 is not particularly large. However, the bus bar for use in the positive electrode normal charging circuit 15 has good heat transfer and dissipation performance. Only with the characteristics of the bus bar, good cooling characteristics of the positive electrode circuit 6 can be obtained. Likewise, FIG. 11 illustrates another example of Variation 2 in which only the negative electrode normal charging relay 20 is controlled and switched on in step S11 of the arithmetic processing in FIG. 4. In this case, the heat dissipation area of the negative electrode circuit 7 extends up to the negative electrode normal charging circuit 16 and the charger wiring material 63. As described above, the conductor cross-sectional area of the charger wiring material 63 is not particularly large. However, the bus bar for use in the negative electrode normal charging circuit 16 has good heat transfer and dissipation performance. Only with the characteristics of the bus bar, good cooling characteristics of the negative electrode circuit 7 can be obtained.

That is, with these variations, it is possible to further expand the heat dissipation areas of the positive electrode circuit 6 and the negative electrode circuit 7, increase the number of choices for heat dissipation routes, and improve heat dissipation performance. In particular, as described above, the positive electrode fast-charging wiring material 61 for coupling the positive electrode fast-charging terminal 58 to the positive electrode terminal for external coupling 11 (the negative electrode fast-charging wiring material 62 for coupling the negative electrode fast-charging terminal 59 to the negative electrode terminal for external coupling 12) is an electric wire having a large conductor cross-sectional area. Thus, thanks to the effect of the positive electrode fast-charging wiring material 61 (negative electrode fast-charging wiring material 62), the positive electrode circuit 6 (negative electrode circuit 7) can achieve higher heat dissipation performance.

The coupling components for use in a vehicle according to the embodiment are described above. However, the disclosure is not limited to the description in the embodiment, and various modifications can be made to the embodiment without departing from the spirit of the disclosure. For example, according to the embodiment, when the temperatures of the respective circuits for vehicle travel reach thresholds for starting cooling of the circuits, a positive electrode charging relay (relays) and an negative electrode charging relay (relays) are controlled and switched on alternately. Regarding the control to switch on the relays, some cases are described above. As a case, only the positive electrode fast-charging relay 17 (the negative electrode fast-charging relay 18) is switched on. As another case, the positive electrode fast-charging relay 17 and the positive electrode normal charging relay 19 (the negative electrode fast-charging relay 18 and the negative electrode normal charging relay 20) are switched on concurrently. As another case, only the positive electrode normal charging relay 19 (the negative electrode normal charging relay 20) is switched on. However, the control to switch on these charging relays are not limited to the above cases. For example, when the temperature of a circuit for vehicle travel reaches the threshold for starting cooling of the circuit, initially, only the positive electrode fast-charging relay 17 (the negative electrode fast-charging relay 18) is controlled and switched on. In this case, the temperature of the positive electrode fast-charging circuit 13 (the negative electrode fast-charging circuit 14) is monitored. Then, when the temperature reaches the temperature at which cooling of the positive electrode fast-charging circuit 13 (the negative electrode fast-charging circuit 14) is considered necessary, the positive electrode normal charging relay 19 (the negative electrode normal charging relay 20) is controlled and switched on.

Moreover, the on-off control for the charging relays in the embodiment is also applicable to, for example, EVs, in which only a motor generator is installed as the driving source of a vehicle. In an EV, when performing control to limit the amount of power from a battery for vehicle travel used for vehicle travel, there is a possibility of a motor generator not being able to supply a driving force desired by a driver. In this case, sufficient vehicle acceleration and deceleration cannot be achieved. In contrast, by using the junction box controller in the embodiment capable of decreasing time during which the control to limit the amount of power from a battery for vehicle travel used for vehicle travel is performed, it is more likely to achieve the vehicle acceleration and deceleration desired by a driver.

As described above, according to the disclosure, the circuits for vehicle travel are cooled rapidly through a simple system in which when the temperature of a circuit for vehicle travel reaches or exceeds a threshold, either of a positive electrode charging relay and an negative electrode charging relay is switched on. Accordingly, it is possible to efficiently cool the circuits for vehicle travel of the electrified vehicle in which the interior of the junction box has the charging relays, resulting in a decrease in problems such as not being able to achieve desired acceleration and deceleration, decreased fuel efficiency, and increased exhaust emissions. In addition, when controlling and switching on the charging relays, either of the positive electrode charging relay and the negative electrode charging relay is switched on. This can suppress an occurrence of a short circuit between an energized positive electrode-side component for external coupling and an energized negative electrode-side component for external coupling that are coupled to the charging circuits in the event of a malfunction, thereby suppressing a possibility of the vehicle smoking and a possibility of catching fire.

The invention claimed is:

1. A junction box controller being a controller of a junction box, the junction box including: a circuit for vehicle travel configured to supply power from a battery for vehicle travel to an electrical component for vehicle travel; and a charging circuit comprising a positive electrode charging relay and an negative electrode charging relay that are for use in coupling and decoupling the battery for vehicle travel to and from an external charging power source in a state in which the positive electrode charging relay and the negative electrode charging relay are coupled to the circuit for vehicle travel, the junction box controller comprising:
  a temperature sensor configured to detect a temperature of the circuit for vehicle travel; and
  a controller configured to, when the temperature of the circuit for vehicle travel detected by the temperature sensor reaches or exceeds a preset threshold, control and switch on either of the positive electrode charging relay and the negative electrode charging relay.

2. The junction box controller according to claim 1, further comprising,
  as the temperature sensor, a first temperature sensor configured to detect a temperature of a positive electrode circuit for vehicle travel and a second temperature sensor configured to detect a temperature of an negative electrode circuit for vehicle travel,
  wherein when either one of the temperature of the positive electrode circuit for vehicle travel detected by the first temperature sensor and the temperature of the negative electrode circuit for vehicle travel detected by the second temperature sensor reaches the preset threshold faster than the other one, the controller controls and switches on either one of the positive electrode charging relay and the negative electrode charging relay that is provided in the positive electrode circuit for vehicle travel or the negative electrode circuit for vehicle travel whose temperature has reached the preset threshold first, and when the temperature of the other circuit has reached the preset threshold, the controller controls and switches on the other of the positive electrode charging relay and the negative electrode charging relay that is provided in the other circuit and, at the same time, controls and switches off either one of the positive electrode charging relay and the negative electrode charging relay that has been controlled and switched on, and thereafter the controller performs the on-off control repeatedly.

3. The junction box controller according to claim 2, wherein the preset threshold is separately settable for the temperature of the positive electrode circuit for vehicle travel and for the temperature of the negative electrode circuit for vehicle travel.

4. The junction box controller according to claim 2, comprising:
  as the charging circuit, a fast-charging circuit for fast charging and a normal charging circuit for normal charging;
  as the positive electrode charging relay, a positive electrode fast-charging relay provided in the fast-charging circuit and a positive electrode normal charging relay provided in the normal charging circuit; and
  as the negative electrode charging relay, an negative electrode fast-charging relay provided in the fast-charging circuit and an negative electrode normal charging relay provided in the normal charging circuit,
  wherein when controlling and switching on the positive electrode charging relay, the controller controls and switches on either one or both of the positive electrode fast-charging relay and the positive electrode normal charging relay, and
  when controlling and switching on the negative electrode charging relay, the controller controls and switches on either one or both of the negative electrode fast-charging relay and the negative electrode normal charging relay.

5. The junction box controller according to claim 2, comprising:
  as the charging circuit, a fast-charging circuit for fast charging and a normal charging circuit for normal charging;
  as the positive electrode charging relay, a positive electrode fast-charging relay provided in the fast-charging circuit and a positive electrode normal charging relay provided in the normal charging circuit; and as the negative electrode charging relay, an negative electrode fast-charging relay provided in the fast-charging circuit and an negative electrode normal charging relay provided in the normal charging circuit, wherein when controlling and switching on the positive electrode charging relay, the controller controls and switches on either one or both of the positive electrode fast-charging relay and the positive electrode normal charging relay, and when controlling and switching on the negative electrode charging relay, the controller controls and switches on either one or both of the negative electrode fast-charging relay and the negative electrode normal charging relay.

\* \* \* \* \*